(12) United States Patent
Chaillie

(10) Patent No.: US 6,802,742 B2
(45) Date of Patent: Oct. 12, 2004

(54) DEVICE FOR MAINTAINING AN ELECTRONIC CARD IN A READING DEVICE

(75) Inventor: Frederic Chaillie, Pechbonnieu (FR)

(73) Assignee: Siemens VDO Automotive, Toulouse Cedex 1 (FR)

( * ) Notice: Subject to any disclaimer, the term of this patent is extended or adjusted under 35 U.S.C. 154(b) by 2 days.

(21) Appl. No.: 10/450,050

(22) PCT Filed: Dec. 17, 2001

(86) PCT No.: PCT/EP01/14906

§ 371 (c)(1),
(2), (4) Date: Jun. 10, 2003

(87) PCT Pub. No.: WO02/052497

PCT Pub. Date: Jul. 4, 2002

(65) Prior Publication Data

US 2004/0018765 A1 Jan. 29, 2004

(30) Foreign Application Priority Data

Dec. 27, 2000 (FR) .......................................... 00 17092

(51) Int. Cl.[7] ............................................. H01R 24/00
(52) U.S. Cl. ...................................... 439/630; 439/325
(58) Field of Search .......................... 439/325, 630–632

(56) References Cited

U.S. PATENT DOCUMENTS

| | | | |
|---|---|---|---|
| 3,851,505 A | 12/1974 | Wilkinson | |
| 4,807,059 A | 2/1989 | Talmadge et al. | |
| 6,129,572 A | 10/2000 | Feldman et al. | |
| 6,206,710 B1 * | 3/2001 | Chen | 439/159 |
| 6,425,775 B1 * | 7/2002 | Chang et al. | 439/188 |

FOREIGN PATENT DOCUMENTS

| | | |
|---|---|---|
| EP | 0 749 088 | 12/1996 |
| EP | 0 881 588 | 12/1998 |
| EP | 0 964 357 | 12/1999 |
| EP | 0 964 358 | 12/1999 |

* cited by examiner

Primary Examiner—Truc Nguyen
(74) Attorney, Agent, or Firm—Young & Thompson

(57) ABSTRACT

A device for maintaining an electronic card (2) in a reading device (4) wherefor the card is manually inserted in a housing of the reading device to reach a position, called reading position, enabling the card to be read by the reading device. It comprises elastic elements (26, 38, 42) acting on the card when the latter is in reading position in three substantially perpendicular active directions.

9 Claims, 4 Drawing Sheets

Figure 1:
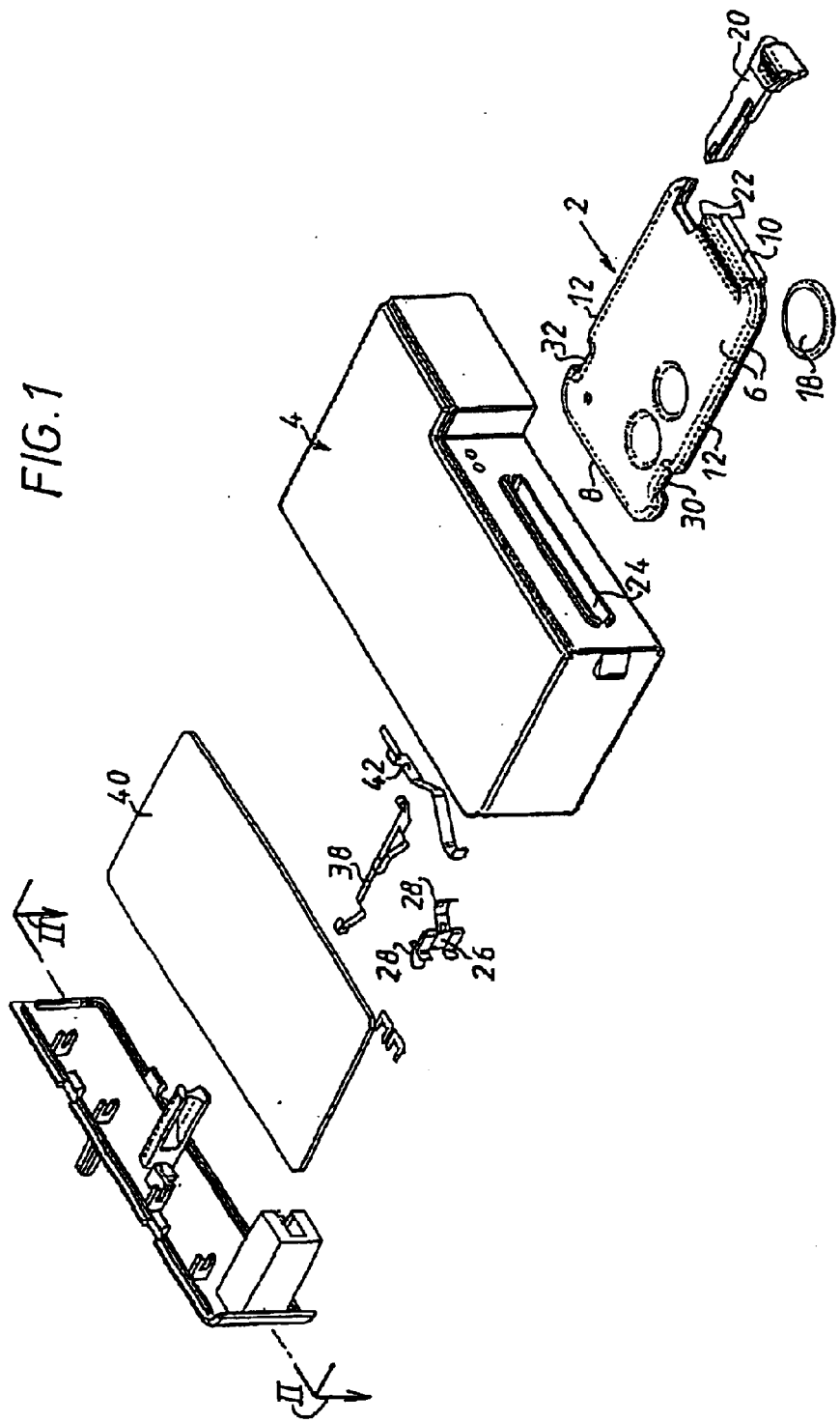

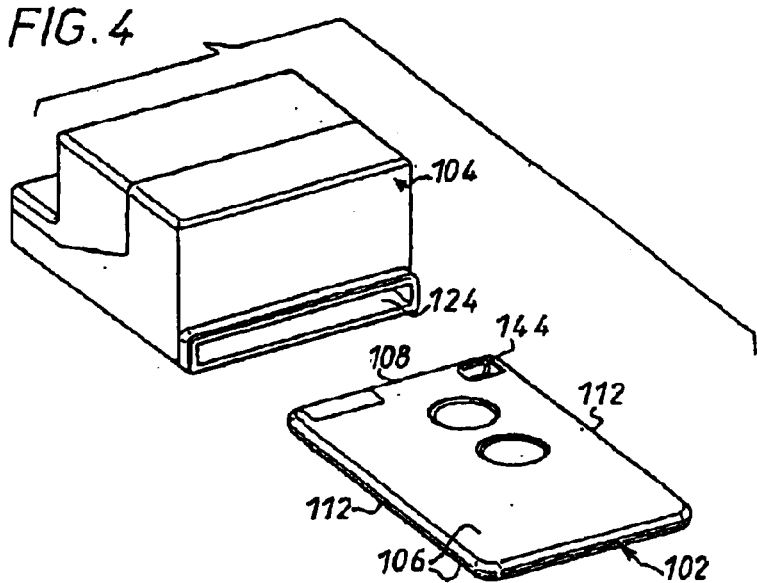
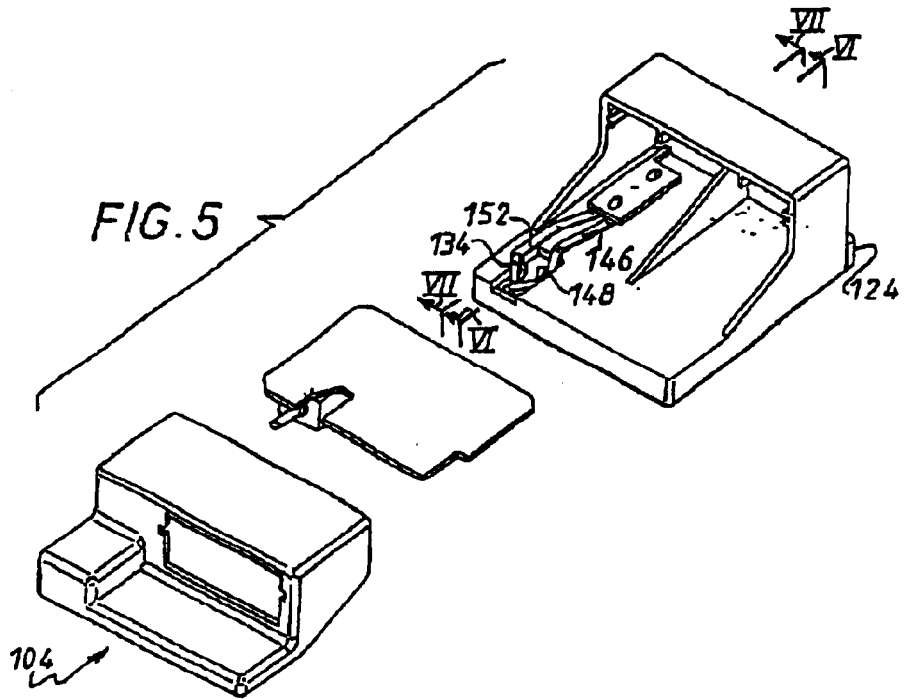

DEVICE FOR MAINTAINING AN ELECTRONIC CARD IN A READING DEVICE

The present invention relates to a device for holding an electronic card in a corresponding reading device.

Within the automotive field, it is known to replace a conventional key cooperating with a mechanical lock by a card containing an electronic device. To access a vehicle, the card transmits a signal to a receiver situated in the cabin of the vehicle. If the receiver recognizes the card, access to board the vehicle is permitted. The information received by the receiver is for example provided to a device making it possible to open and close the doors. The card can also serve as ignition key and a reader is in this case located in the cabin of the vehicle.

The card is generally of rectangular shape and is made of a synthetic material. It carries an electronic circuit, electrical contacts and, generally, a transmitter, possibly receiver, for exchanging data remotely. The electrical contacts are optional since the exchange of information between the card and the reading device can be effected for example by inductive, radiofrequency or infrared coupling.

The reader generally takes the form of a casing furnished on its front face with a slot into which the card is inserted. The insertion of the card into the casing is done manually. It is then necessary to make provision for good positioning and good holding of the card in the reader so as to guarantee a good exchange of information.

In a motor vehicle, the use of a card to provide for functions such as starting requires particular precautions. The reading device into which the card is introduced must provide, among other things, for accurate positioning and light gripping of the card during the placing of the card into the reading device. It is moreover necessary to prevent the card from vibrating in its housing so as to avoid any risk of wear and of sound nuisance. Finally, latching and retention under considerable force must also be envisaged if one wishes the card to remain in the reading device when the motor vehicle is used.

Devices for latching an electronic card in a reader already exist. Most of these systems relate to the field of banking and more generally to card-based payment devices. Within this field, there is no vibration stress as in a motor vehicle.

Document U.S. Pat. No. 4,807,059 discloses a device adapted for receiving and holding a memory card or diskette. This device provides for holding and immobilizing the diskette during the reading and/or the transferring of data to an associated computer. However, such a device is intended neither to be put in place in a vehicle nor to undergo considerable and frequent vibrations. The means of holding the card are not adapted, in particular, for damping these vibrations.

Document U.S. Pat. No. 3,851,505 relates to a device for immobilizing a parking card in a vehicle. This parking card is not in electronic contact with the vehicle. The immobilizing device comprises in particular an immobilizing peg which inserts into an opening made on the card so as to immobilize it positionally. The insertion of the peg is operated by an electromagnet. Here, one is dealing only with an immobilizing device and no means exist for damping the vibrations transmitted by the vehicle.

Document U.S. Pat. No. 6,129,572 relates to an electrical connector furnished with a latch for retaining a printed circuit card. The card is furnished with a connection device (pins) which fits into a complementary part made on the connector. An immobilizing latch holds the card immobilized longitudinally while it is not unlatched. However, this card is not intended to be put in place in a vehicle and such a device does not make it possible to avoid the transmission of the vibrations of the vehicle to the card during the movement of the vehicle.

In the automotive field, latching devices exist. Thus, document EP-0 964 357-A describes for example a casing intended to receive a rigid or semi-rigid data medium in which the data medium comprises a lateral immobilizing catch. For its part, the casing receiving this medium comprises a controlled lever for immobilizing the medium which is mounted pivotably so as to be able, in an immobilizing position, to be positioned inside the immobilizing catch so as to preclude any withdrawal of the medium from the reading device.

This device, just like the other known devices of the prior art, certainly makes it possible to latch the card in the reader, thus preventing any inadvertent withdrawal of the card from the reader during use of the vehicle, but does not provide for good holding in space of the card. Moreover, the latching of the card in its housing may, in certain cases, be related to relatively considerable mechanical stresses exerted on the card. Internal tensions then appear inside the reader.

The aim of the present invention is thus to provide a device for holding an electronic card in a corresponding reader making it possible to provide excellent holding of the card in the reader. Preferably, this device will make it possible to avoid the appearance of considerable stresses inside the reader.

For this purpose, the device that it proposes is a device for holding an electronic card in a reading device for which the card is inserted manually into a housing of the reading device so as to arrive at a position, the so-called reading position, allowing the reading of the card by the reading device.

According to the invention, this holding device comprises elastic means acting on the card when the latter is in the reading position in three substantially perpendicular directions of action.

In this way, the card is held perfectly and the mechanical stresses which are exerted on it are perfectly controlled.

In one embodiment, a first spring is disposed at the back of the housing in the direction of insertion of the card, a second spring acts on a face of the card and a third spring acts on a lateral edge of the card, the card comprising an upper face, a lower face, a front edge inserted first into the housing, a rear edge opposite the front edge and two lateral edges connecting the front edge to the rear edge. Here the elastic means are springs but other elastic means, such as foam or rubber pads, may also be used. Likewise, the points of action of the elastic means are preferred points of action adapted to the most frequently encountered case of rectangular electronic cards.

In a variant embodiment, the card may exhibit a notch intended to cooperate with a boss of a spring in such a way as to determine a stopping position in the direction of insertion of the card into its housing.

In this variant, provision may be made for two bosses to be provided on the spring thus defining two stopping positions in the direction of insertion of the card into the housing.

To prevent untimely withdrawal of the card from the reading device, a device for latching the card in the housing is advantageously provided. The latching may then be carried out by holding a flexible arm in a recess provided in the card so as to receive it in the reading position. Another embodiment makes provision for example for the latching to be carried out by inserting a latch or the like into a recess provided for this purpose in the card. Finally, in another embodiment, the latching is for example carried out by inserting an index or similar into a recess provided for this purpose in the card, a latch being provided to hold the index in the recess.

When latching is provided for, the latter is preferably carried out with the aid of an electromagnet. Thus control may be effected electrically and a considerable latching force is obtained even for a small-sized latching device.

An advantageous embodiment makes provision for the elastic means to comprise a spring shaped in such a way as to exhibit a boss cooperating with a recess of the card in the reading position and extending toward the back of the housing in such a way that its free end is disposed between the back of the housing and a front edge of the card and exerts on the latter, in the reading position, a stress in the direction of insertion of the card into its housing. Thus, one and the same component plays the role of two springs, thus limiting the costs of the device and its bulk.

The present invention also relates to a device for reading an electronic card incorporating a holding device as described above.

Figure 2:
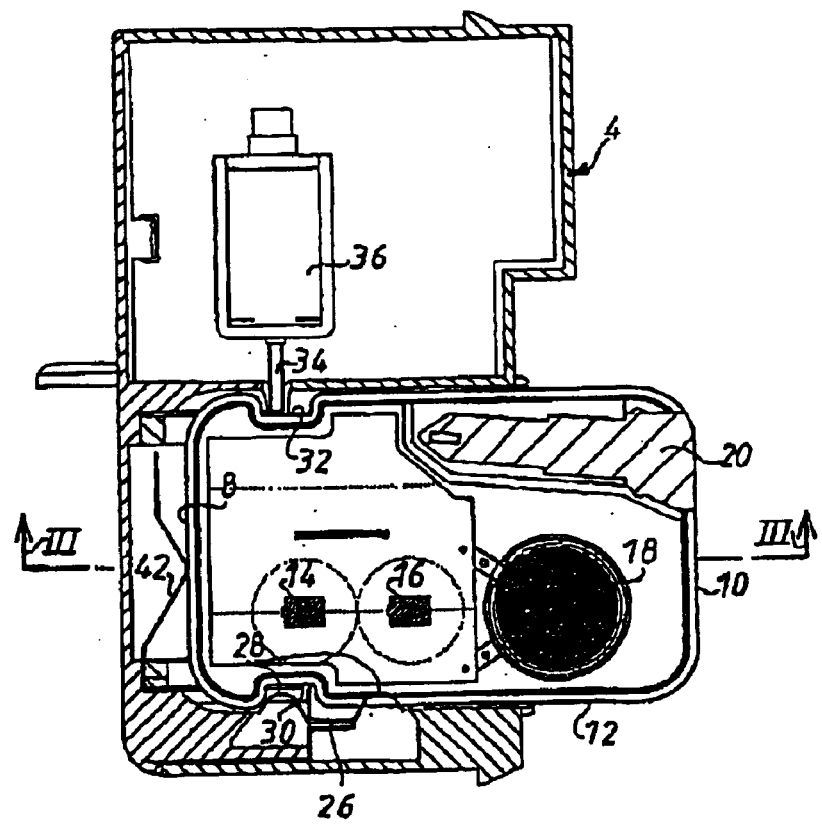
Figure 3:
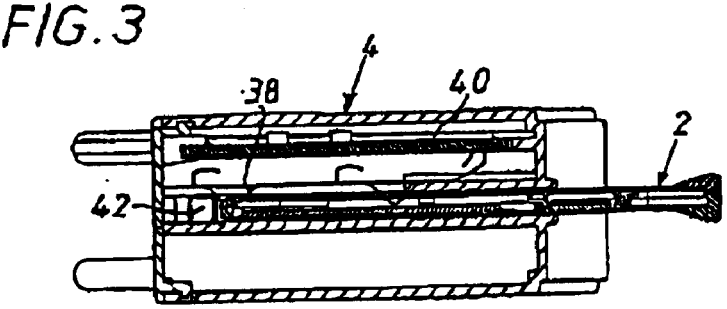
Figure 6:
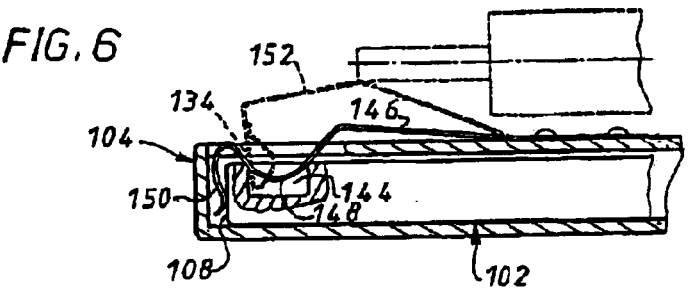
Figure 7:
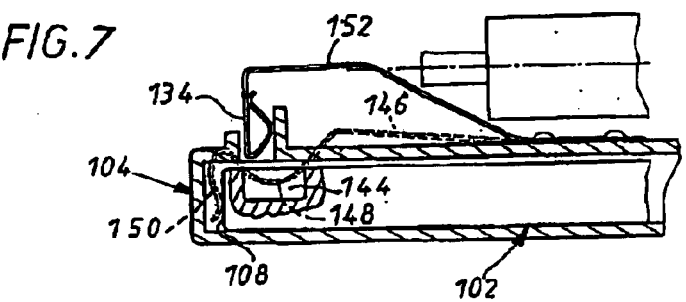
Figure 8:
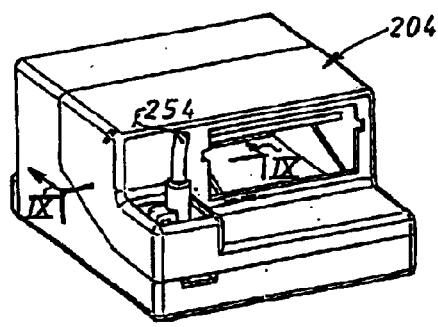
Figure 9:
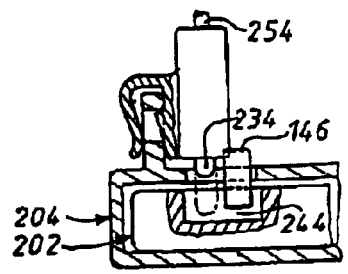

Advantages and details of the present invention will emerge more clearly from the following description which is given with reference to the appended diagrammatic drawing in which:

FIG. 1 is an exploded perspective view of a reader and of a corresponding card,

FIG. 2 is a sectional view on a magnified scale along the section line II—II of FIG. 1, FIG. 3 is a sectional view along the section line III—III of FIG. 2, FIG. 4 is an overall perspective view of a variant embodiment, FIG. 5 shows in exploded perspective the variant embodiment of FIG. 4, FIG. 6 is a sectional view on a magnified scale, in the latched position, according to the section line VI—VI of FIG. 5, FIG. 7 is a sectional view on a magnified scale, in the unlatched position, along the section line VII—VII of FIG. 5, FIG. 8 is a perspective view of a third reading device according to the invention, and FIG. 9 is a detail view on a magnified scale along the section line IX—IX of FIG. 8.

A first embodiment of a device for holding a card 2 in a reader 4 is represented in FIGS. 1 to 3.

The card 2 has a rectangular shape. It comprises two large faces 6, a front edge 8, a rear edge 10 and two lateral edges 12. The front edge is that which is intended to be inserted first into the reader 4. The rear edge is opposite to it.

The card 2 is for example made of synthetic material and is obtained by injection molding. It contains for example an integrated circuit 14 and a transmitter 16. A battery 18 allows the energizing of the circuit 14 and of the transmitter 16. A backup key 20 is disposed in a housing emerging into the rear edge of the card 2. At the level of this rear edge, a thickening 22 is provided so as to facilitate the grasping of the card. This thickening 22 also makes it possible to construct a registration device. Specifically, it suffices to provide a sufficiently considerable thickening as to preclude any insertion of the card 2 into the reader 4 when the rear edge 10 is presented face-on onto the reader 4.

The reader 4 contains electronics (not represented) making it possible to provide for a dialog with the card 2. It exhibits a slot 24 for inserting the card 2. As suggested above, this slot is of dimension adapted to the front edge 8 of the card 2. A housing is provided behind this insertion slot 24 to receive the card 2. Once the latter has been inserted into the housing, the dialog between the reader 4 and the card 2 is established via a transmission with or without electrical contact. By way of nonlimiting examples, there may be inductive coupling, an infrared or radiofrequency dialog or else electrical contacts between the card 2 and the reader. The means allowing this dialog not forming part of the present invention, they will not be described in greater detail here.

The reader 4 is for example disposed at the level of a dashboard of a motor vehicle. To start the vehicle, a user inserts the card 2 into the reader 4 via the insertion slot 24. The reader 4 represented in the drawing makes it possible to carry out accurate positioning of the card in the housing intended to receive it as well as, initially, light gripping of this card in the housing. Subsequently, latching and retention under considerable force are provided for. This latching is for example operated by switching on the engine. Thus, the card is prevented from falling or from being extracted inadvertently, or else from being withdrawn while the engine is running. Finally, to limit the risks of wear and not create any sound nuisance, the card 2 is held in its housing without vibrating.

To provide for good holding of the card 2 in its housing, three spring leaves are provided.

A first spring leaf 26 exhibits two bosses 28. This spring leaf 26 is disposed in the reader 4 in such a way that the bosses 28 come into contact with a lateral edge 12 of the card 2 when the latter is inserted into the housing intended for it. The corresponding lateral edge 12 of the card 2 exhibits a cutout 30 intended to cooperate with the bosses 28. Thus, upon the insertion of the card 2 into its housing, the cutout 30 initially faces a first boss 28 thus carrying out a first positioning of the card 2 in its housing. A specific action may be associated with this position. It will for example be possible to permit the working of the accessories of the vehicle when the card 2 is in this position in the reader. The gripping of the card is here carried out only by the corresponding mating shape of a first boss 28 and of the cutout 30, as well as to the elasticity of the spring leaf 26. A slight pull, or a slight push, make it possible to withdraw the card from its housing or respectively to engage this card fully in its housing.

When the card 2 is pushed further forward in the housing, the cutout 30 takes up station facing the second boss 28 of the spring leaf 26. The card 2 is then in a position allowing the starting of the engine.

In this last position of the card 2, provision is made to carry out latching of the latter in its housing. For this purpose, the lateral edge 12 opposite the lateral edge carrying the cutout 30 is itself also furnished with a cutout 32 intended to cooperate with latching means. The latter are represented in FIG. 2 and comprise a latching index 34 operated by an electromagnet 36. The latching index 34 moves in the plane of the card 2 in a direction perpendicular to the direction of insertion of the card into the reader 4. This index 34 is stationed in such a way that, when the cutout 30 is facing the second boss 28 of the spring leaf 26, corresponding to the fully engaged position of the card 2 in the reader 4, the index 34 is facing the cutout 32. Thus, the insertion of the index 34 into the cutout 32 makes it possible to provide latching aimed at preventing the withdrawal of the card 2 from its housing.

The spring leaf 26 makes it possible to prevent the vibrations of the card 2 in its housing as regards vibrations in a direction substantially perpendicular to the direction of insertion of the card into the reader 4 and oriented in the plane of the card 2. By virtue of the presence of the two bosses 28, contact is always established between one of them and the corresponding lateral edge 12 of the card 2. An elastic prestress is thus exerted on this lateral edge, perpendicularly to the latter and in the plane of the card 2.

A second spring leaf 38 will act on a face 6 of the card 2 when the latter is inserted into its housing. Here, in order to be consistent with the drawing, this second spring 38 will be regarded as acting on the upper face of the card 2. Of course another embodiment could provide for an action on the lower face of the card 2. The spring 38 takes the form of a leaf split over a good part of its length, thus defining two independent arms of different lengths. Each arm carries a boss directed toward the upper face 6 of the card 2. The spring is disposed longitudinally with respect to the direction of insertion of the card 2 into the reader 4. Thus, when the card 2 is fully inserted into the reader 4, the spring 38 bears at two points, corresponding to the two bosses, on the upper face 6 of the card. The spring 38 bears on a plate 40 delimiting the housing into which the card 2 is inserted.

A third spring leaf 42 takes up station at the back of the housing receiving the card 2 and acts on the front edge 8 of the card 2 when the latter is depressed fully into its housing. This spring leaf 42 exhibits a boss facing the front edge 8. It acts on the card 2 in the plane of the latter and in the direction of insertion into the reader 4. The stress of the spring leaf 42 is exerted in the opposite sense from the insertion sense. In the present text, the direction is regarded as being a line of action and the sense is an oriented direction. Thus, a movement in a direction may be performed in two different senses. In the latched position of the card 2 in the reader 4, the spring leaf causes an edge of the cutout 32 to bear against the latching index 34.

Furthermore, while the card 2 is being engaged in its housing, the front edge 8 of the card 2 will abut on this spring leaf 42, thus requiring the user to exert a force on the card in order to insert it fully into its housing. The spring leaf 42 exhibits for example a characteristic such that the insertion force perceived by the user in order to arrive at the fully engaged position is greater than the force required to carry out the positioning of the card at the level of the first spring leaf 26. In this way, the user is afforded comfort in the perception of the card insertion action. Better ergonomics of the device are thus produced.

This third spring leaf 42 furthermore facilitates the extraction of the card 2 from its housing when the latching device goes to the unlatched position.

The three springs 26, 38 and 42 are made from materials which are resistant to time, to wear and to oxidation. They will preferably be made from a stainless type spring steel. This material also makes it possible to use the springs as electrical contacts. Provision may then be made for the electromagnet 36 to be operated in order to bring about the insertion of the latching index 34 into the cutout 32 when the card 2 acts on the spring leaf 42 located at the back of the housing.

The spring 38 can be used to detect the position of the card 2 in the reader 4. The plate 40 represented in the drawing (FIG. 3) supports for example electronic components of the reader 4. It is noted (FIG. 3) that the spring 38 comprises three bosses: a first at the free end of the common trunk carrying the two arms of this spring and one at each free end of the two arms. Electrical contacts are then provided on the plate 40 facing each of these bosses. The first boss, on the common trunk, is in permanent electrical contact with the plate 40. By inserting the card 2 into the reader 4, a second boss comes into contact with the plate 40. The card 2 is then in its first indexed position. When it arrives at its second indexed position, the third boss establishes a second electrical contact. It is thus possible to detect the card electrically when it is in the two indexed positions. It is noted in the drawing that the bosses are inwardly curved so as to protect the contact faces of the plate 40. As a variant embodiment, these electrical contact faces could be replaced by micro-switches.

FIGS. 4 to 7 show a variant embodiment of the reader and of the card represented in FIGS. 1 to 3.

In this embodiment, for the components manifesting similar functions to those manifested by components of the first embodiment, the same references will be used, increased by the number 100.

Depicted once again is a card 102 intended to be inserted into a reader 104 via an insertion slot 124. The card 102 is again of substantially the same shape as the card of the previous embodiment. Note, however, that this card does not have any cutouts on its lateral edges 112. Nevertheless, at the level of its faces 106 it has a hole 144 placed in proximity to the front edge 108. In the example shown, the hole 144 emerges into the upper face 106 of the card 102.

In this embodiment, the first spring acting on a lateral edge 112 is kept. Here, the same shape of spring can be adopted again even if there is no provision in this embodiment to provide two successive snap-fit positions for the card in the housing. The two bosses then allow better bearing on the corresponding edge 112. This first spring is not represented in the drawing. It acts on a first lateral edge 112 of the card 102 substantially in the plane of this card and in a direction perpendicular to the direction of insertion of the card into the reader 104.

The second and third springs of the first embodiment are replaced here with a single spring 146. FIGS. 5 and 6 show this spring clearly. The latter is made from a stainless type spring steel and takes the form of a leaf. A boss 148 oriented toward the upper face 106 of the card 102 is made on the spring 146. The boss is disposed on the spring 146 and the spring 146 is disposed in the reader 104 in such a way that, when the card 102 is fully inserted into the reader 104 and is correctly positioned, the boss lies in the hole 144. The spring 146 exhibits a free end 150 which is folded back by around 90° with respect to the spring 146. This free end 150 is folded back in such a way that it will take up station between the front edge 108 of the card 102 and the back of the housing intended to receive this card 102, the card being in the active position in the housing. This free end 150 is S-shaped so as to be able to act elastically on the front edge 108 of the card 102.

Thus the spring 146 plays the same role as the springs 38 and 42 of the first embodiment. On the one hand the spring 146 acts in a direction perpendicular to the plane of the card by way of its boss 148 and on the other hand it acts in the direction of insertion of the card by virtue of its free end 150.

In this embodiment, the latching is carried out in a different way than in the first embodiment.

Here, for the latching, an electromagnet 136 is also used. The electromagnet acts on an elastically flexible arm 152. This arm 152 comprises a free end forming a latching index 134. In the latched position, this index 134 is positioned in the hole 144 and is held in this position by the electromagnet (FIG. 6). The flexible arm 152 restores the index 134 to the unlatched position, that is to say outside the hole 144. As shown by FIGS. 6 and 7, the electromagnet acts at the level of an inclined portion of the flexible arm 152 so as to cause the finger 134 to enter the hole 144.

FIGS. 8 and 9 show a third embodiment of a reader according to the invention. Here, the components exhibiting a function similar to the components represented in FIGS. 1 to 3 will bear the same references but increased by the number 200.

FIG. 8 shows, in a view from behind, a reader 204. This reader exhibits a general shape much like that of the reader of the second embodiment (cf FIGS. 4 and 5). This reader also has a device for holding a card 202 but latching is carried out differently. Here, a latching index 234, actuated by a mechanical cable 254, carries out latching in cooperation with a hole 244 identical to the hole 144 of the previous embodiment. The mechanical power transmitted to the latching index 234 by way of the cable 254 may emanate, for example, from a jack of a steering column locking system. This jack is not represented in the drawing. The latching is then achieved without involving a flexible component.

The present invention is not limited to the embodiments described above by way of nonlimiting examples but extends also to the variant embodiments within the scope of the person skilled in the art, within the framework of the claims hereinbelow.

Thus, the description above shows that the electronic card can have two positionings in the reader. It is also possible to have just a single positioning. Furthermore, latching may be performed directly by a mechanical or electromechanical system or by way of a spring. These various alternatives may be combined differently than in the embodiments described in greater detail above.

The above description deals with two types of card: a first type where the card exhibits at least one notch on a lateral edge and a second type where the electronic card exhibits a hole on one of its faces.

The positioning of holes or of notches on the card making it possible to carry out good positioning and/or latching of the card is irrelevant. It suffices to place the indexing and/or latching elements in correspondence facing these notches and/or holes. Likewise, as has been seen, one and the same notch may serve both for the latching and for the positioning of the card but it is also possible to choose a notch or a hole for the latching and a notch or a hole for the positioning. The holes may be through-holes or emerge into just one face, as described above.

The elastic means described in the above description are springs made from a stainless spring steel leaf. However, other elastic means could be chosen. It is conceivable to use for example flexible arms which would be molded as one component with the casing of the reader. Indexing devices using for example an indexing finger prestressed by a spiral or other spring are also conceivable. The springs may also be replaced by a foam or by rubber strips. Numerous possibilities, even ones other than those mentioned hereinabove, offer themselves to the person skilled in the art in order to produce an elastic stress on the card to be held.

What is claimed is:

1. A device for holding an electronic card (2; 102; 202) in a reading device (4; 104; 204) for which the card is inserted manually into a housing of the reading device so as to arrive at a position, the so-called reading position, allowing the reading of the card by the reading device, said device comprising elastic means (26, 38, 42; 146) acting on the card when the latter is in the reading position in three substantially perpendicular directions of action, said device being characterized in that the elastic means comprise a spring (146) shaped in such a way as to exhibit a boss (148) cooperating with a recess (144) of the card in the reading position and extending toward the back of the housing in such a way that its free end (150) is disposed between the back of the housing and a front edge (108) of the card and exerts on the latter, in the reading position, a stress in the direction of insertion of the card into its housing.

2. The holding device as claimed in claim 1, characterized in that a first spring (42) is disposed at the back of the housing in the direction of insertion of the card, and in that a second spring (38) acts on a face of the card and in that a third spring (26) acts on a lateral edge (12) of the card, the card (2) comprising an upper face, a lower face, a front edge inserted first into the housing, a rear edge opposite the front edge and two lateral edges connecting the front edge to the rear edge.

3. The holding device as claimed in claim 1, characterized in that the card (2) exhibits a notch (30) intended to cooperate with a boss (28) of a spring (26) in such a way as to determine a stopping position in the direction of insertion of the card into its housing.

4. The holding device as claimed in claim 3, characterized in that two bosses (28) are provided on the spring (26) thus defining two stopping positions in the direction of insertion of the card (2) into the housing.

5. The holding device as claimed in claim 1, characterized in that a device (36; 136, 152; 234, 254) for latching the card in the housing is provided.

6. The holding device as claimed in claim 5, characterized in that the latching is carried out by holding a flexible arm (152) in a recess (144) provided in the card so as to receive it in the reading position.

7. The holding device as claimed in claim 5, characterized in that the latching is carried out by inserting a latch (34; 234) or the like into a recess (32; 244) provided for this purpose in the card.

8. The holding device as claimed in claim 5, characterized in that the latching is carried out with the aid of an electromagnet (36; 136).

9. A device for reading an electronic card, characterized in that it incorporates a holding device as claimed in claim 1.

* * * * *